(12) United States Patent
Kennemur (10) Patent No.: US 11,136,426 B2
(45) Date of Patent: Oct. 5, 2021

(54) CYCLOPENTENE MONOMERS AND METHODS OF POLYMERIZATION

(71) Applicant: Florida State University Research Foundation, Inc., Tallahassee, FL (US)

(72) Inventor: Justin G. Kennemur, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 21 days.

(21) Appl. No.: 16/223,391

(22) Filed: Dec. 18, 2018

(65) Prior Publication Data

US 2019/0185603 A1 Jun. 20, 2019

Related U.S. Application Data

(60) Provisional application No. 62/607,948, filed on Dec. 20, 2017.

(51) Int. Cl.
| | |
|---|---|
| *C08F 232/04* | (2006.01) |
| *C08F 4/80* | (2006.01) |
| *C08F 216/16* | (2006.01) |
| *C08F 216/10* | (2006.01) |
| *C08G 61/08* | (2006.01) |
| *B01J 31/22* | (2006.01) |

(52) U.S. Cl.
CPC .............. *C08F 232/04* (2013.01); *C08F 4/80* (2013.01); *C08F 216/10* (2013.01); *C08F 216/165* (2013.01); *C08G 61/08* (2013.01); *B01J 31/2265* (2013.01); *B01J 2531/821* (2013.01); *C08G 2261/144* (2013.01); *C08G 2261/1424* (2013.01); *C08G 2261/212* (2013.01); *C08G 2261/3321* (2013.01)

(58) Field of Classification Search
CPC ................. C08F 232/04; C08F 4/80
See application file for complete search history.

(56) References Cited

U.S. PATENT DOCUMENTS

2003/0236377 A1* 12/2003 Choi ............... C08G 61/08
526/335

OTHER PUBLICATIONS

Tuba et al., "One-Pot Synthesis of Poly(vinyl alcohol) (PVA) Copolymers via Ruthenium Catalyzed Equilibrium Ring-Opening Metathesis Polymerization of Hydroxyl Functionalized Cyclopentene," Macromolecules, 2014, 47, 8190-8195. (Year: 2014).*
Hejl et al., "Ring-Opening Metathesis Polymerization of Functionalized Low-Strain Monomers with Ruthenium-Based Catalysts," Macromolecules, 2005, 38:7214-7218.
Neary et al., "A Precision Ethylene-Styrene Copolymer with High Styrene Content from Ring-Opening Metathesis Polymerization of 4-Phenylcyclopentene," Macromol. Rapid Commun., 2016, 37:975-979.

(Continued)

*Primary Examiner* — Catherine S Branch
(74) *Attorney, Agent, or Firm* — Eversheds Sutherland (US) LLP (57) ABSTRACT

Cyclopentene monomers and methods of polymerization, including the polymerization of the cyclopentene monomers. The cyclopentene monomers include allylic substituted cyclopentene monomers that may be racemic or enantiopure. The methods of polymerization may permit the resulting polymers to have one or more desirable structural features.

20 Claims, 7 Drawing Sheets

(56) References Cited

OTHER PUBLICATIONS

Neary et al., "Variable Temperature ROMP: Leveraging Low Ring Stain Thermodynamics to Achieve Well-Defined Polypentenamers," Macromolecules, 2017, 50:4935-4941.
Scherman, "Synthesis of Well-Defined Poly((vinyl alcohol)2-alt-metehylene) via Ring-Opening Metathesis Polymerization," Macromolecules, 2002, 35:5366-5371.
Sita et al., "Main-Chain Chiral Polymers from Beta-Citronellene via Tandem Diene Metathesis Cyclization/Ring-Opening Metathesis Polymerization," Macromolecules, 1995, 28:656-667.

* cited by examiner

CYCLOPENTENE MONOMERS AND METHODS OF POLYMERIZATION

CROSS-REFERENCE TO RELATED APPLICATIONS

This application claims priority to U.S. Provisional Patent Application No. 62/607,948, filed Dec. 20, 2017, which is incorporated herein by reference.

BACKGROUND

Polyolefins derived from vinyl monomers inherently feature a two-carbon branch periodicity (x=2), while diene monomers offer two possible periodicities (x=2 or 4) depending on the mode of addition. For years, researchers have sought to improve control over one or more features of these materials, such as molar mass, dispersity (Ð), tacticity, or other structural features (e.g. 1,2- or 1,4-addition).

Research on the x>4 topological landscape, including the vast amount of branch functionalities supplied by vinyl monomers, has mostly focused on ethylene copolymerization strategies to increase the distance between vinyl branches. Advances in molecular or single-site catalysts have provided a variety of copolymers containing ethylene and vinyl monomers, and attempts have been made to incorporate branches reproducibly at precise x.

Two strategies that have been used in an attempt to obtain precise topologies for polyolefins are ring-opening metathesis polymerization (ROMP) and acyclic diene metathesis (ADMET) polymerization, wherein cyclic alkenes or linear α-ω-terminal diene monomers, respectively, are designed to produce polyalkenamers with branch periodicities pre-programmed by monomer design. After polymerization, the backbone olefins can be hydrogenated to produce precision-branched polyethylene materials.

In addition to x, geometric isomers (cis vs trans) and stereoregularity (tacticity) present additional synthetic challenges, with multiple facets of structural precision. Moreover, a singular allylic branch typically requires the use of an asymmetric monomer, and, therefore, positional insertion on a catalyst, such as a metal carbene catalyst, can lead to regioirregularity (e.g., head or tail connectivity).

The five-carbon branch periodicity (x=5) is a unique topology within the structure-property genome that is typically inaccessible through vinyl or diene copolymerization strategies due to the odd number of repeating unit carbons, and ROMP of cyclopentene (CP) produces unique elastomers.

Computational studies have shown that different substituents at varying positions (allylic (chiral) or homoallylic (achiral)) of CP can have one or more effects on the strain of these monomers.

Polymerization of homoallylic substituted CPs have been reported, and, due to the achiral monomer symmetry, the polymerization results in perfectly regioregular polymers with a precise periodicity (x=5)(see, e.g., Neary, W. J. et al., *Macromol. Rapid Commun.*, 2016, 37, 975-979; and Nearly, W. J. et al., *Macromolecules*, 2017, 50, 4935-4941). However, little or no control over the tacticity of the resulting polymers has been predicted or achieved with achiral ROMP catalysts, and polyolefins that are about 70% trans are typical, regardless of their substituents.

Alternatively, allylic substituted CPs are chiral and have an increased variety of microstructural outcomes. Typically, careful choice of the allylic substituent must be taken due to its ability to reduce the reactivity (bond order) of the olefin within the ring.

It has been shown that 3-acetoxycyclopentene is unable to undergo ROMP at ambient temperatures (Hejl, A., et al., *Macromolecules*, 2005, 38, 7214-7218). Diallylic substitutions of alcohols and acetoxy groups also have been unsuccessful (Scherman, O. A. et al., *Macromolecules*, 2002, 35, 5366-5371). A method for producing enantiopure (R)-3-methylcyclopentene from β-citronellene has been reported, and the ROMP on this monomer at −30° C. using a molybdenum based catalyst produced polymers with a 3:1 trans:cis ratio that were isotactic and exclusively head-to-tail (HT) (Sita, L. R., *Macromolecules*, 1995, 28, 656-657). This is believed to be the only reported example of the creation of successful, precision polypentenamers from an allylic substituted monomer, and no reports exist that explore other catalysts, such as Ru-based catalysts, which can offer greater monomer scope through functional group tolerance.

There remains a need for monomers and methods of polymerizing monomers that offer control over one or more features of the resulting polymers, such as tacticity, regioregularity, and/or periodicity. There also remains a need for methods that can be used to form polypentenamers having one or more predictable features, including methods that rely on Ru-based catalysts.

BRIEF SUMMARY

Provided herein are allylic substituted cyclopentene monomers, and methods of polymerizing allylic substituted cyclopentene monomers that may produce polymers having one or more predictable and/or desirable structural features. For example, in some embodiments, the allylic substituted cyclopentene is an enantiopure (about 92% ee) 3-triethylsiloxy-cyclopentene, which may be polymerized, according to embodiments of the methods provided herein, to produce a polymer having a structure with at least 96% trans olefins and 92% head-to-tail positional isomers.

In one aspect, monomers are provided, including allylic substituted cyclopentene monomers. In some embodiments, the monomers include an allylic substituted cyclopentene having a structure according to at least one of Formula I and Formula II— wherein $R^1$, $R^2$, $R^3$, and $R^4$ are independently selected from hydrogen and a $C_1$-$C_{30}$ hydrocarbyl.

In another aspect, methods of polymerization are provided. In some embodiments, the methods include contacting an allylic substituted cyclopentene with a catalyst to form a polymer. The allylic substituted cyclopentene may include the allylic substituted cyclopentenes disclosed herein, including those having a structure according to at least one of Formula I and Formula II.

In yet another aspect, polymers are provided. In some embodiments, the polymers include those obtained through embodiments of the methods described herein.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Monomers are provided herein, including allylic substituted cyclopentene monomers, and methods of polymerizing monomers, including allylic substituted cyclopentene monomers, also are provided.

Monomers

In some embodiments, the monomers include an allylic substituted cyclopentene having a structure according to at least one of Formula I and Formula II— wherein $R^1$, $R^2$, $R^3$, and $R^4$ are independently selected from hydrogen and a $C_1$-$C_{30}$ hydrocarbyl. If at least two of $R^2$-$R^4$ are selected from a $C_1$-$C_{30}$ hydrocarbyl, then the at least two of $R^2$-$R^4$ may be different $C_1$-$C_{30}$ hydrocarbyls due to the fact that each of $R^2$-$R^4$ is "independently" selected from hydrogen and a $C_1$-$C_{30}$ hydrocarbyl.

In some embodiments, the allylic substituted cyclopentene of Formula I or Formula II is a racemic allylic substituted cyclopentene. The phrase "racemic allylic substituted cyclopentene", as used herein, generally refers to allylic substituted cyclopentenes having an enantiomeric excess (ee) of 0% to about 5%, wherein the enantiomeric excess defines the excess of the (R) or (S) enantiomer of the allylic substituted cyclopentene, wherein the (R) and (S) enantiomers are those imparted by the chiral allylic carbon (e.g., the carbon atom of the cyclopentene ring to which the oxygen atoms of Formula I and Formula II are bonded).

In some embodiments, the allylic substituted cyclopentene of Formula I or Formula II is an enantiopure allylic substituted cyclopentene. The phrase "enantiopure allylic substituted cyclopentene", as used herein, generally refers to allylic substituted cyclopentenes having an enantiomeric excess of about 90% to 100%, wherein the enantiomeric excess defines the excess of the (R) or (S) enantiomer of the allylic substituted cyclopentene, wherein the (R) and (S) enantiomers are those imparted by the chiral allylic carbon (e.g., the carbon atom of the cyclopentene ring to which the oxygen atoms of Formula I and Formula II are bonded).

Although the allylic substituted cyclopentenes are, in some embodiments, enantiopure allylic substituted cyclopentenes or, in some embodiments, racemic allylic substituted cyclopentenes, the allylic substituted cyclopentenes herein may have an enantiomeric excess of 0% to 100%.

In some embodiments, the allylic substituted cyclopentene has the structure according to Formula I, wherein $R^1$ is a $C_1$-$C_{20}$ hydrocarbyl, a $C_1$-$C_{10}$ hydrocarbyl, a $C_1$-$C_5$ hydrocarbyl, or a $C_1$-$C_3$ hydrocarbyl.

In some embodiments, the allylic substituted cyclopentene has the structure according to Formula II, wherein each of $R^2$, $R^3$, and $R^4$ is independently selected from a $C_1$-$C_{20}$ hydrocarbyl, a $C_1$-$C_{10}$ hydrocarbyl, a $C_1$-$C_5$ hydrocarbyl, or a $C_1$-$C_3$ hydrocarbyl.

In some embodiments, the allylic substituted cyclopentene has the structure according to Formula I, wherein $R^1$ is hydrogen.

In some embodiments, the allylic substituted cyclopentene (i) is a racemic allylic substituted cyclopentene, (ii) has a structure according to Formula I, wherein $R^1$ is a $C_2$-hydrocarbyl comprising an oxo substituent, and (iii) has the following structure:

In the structures of racemic allylic substituted cyclopentenes provided herein, "〰〰" is used to indicate the covalent bond between the oxygen atom and chiral allylic carbon of Formula I and Formula II.

In some embodiments, the allylic substituted cyclopentene (i) is an enantiopure allylic substituted cyclopentene, (ii) has a structure according to Formula I, wherein $R^1$ is a $C_2$-hydrocarbyl comprising an oxo substituent, and (iii) has one of the following structures:

Since the "enantiopure" materials may have a 90% to 100% excess of one enantiomer, the enantiopure allylic substituted cyclopentene may include at least 95% of the enantiomer appearing in excess, and 5% or less of the other enantiomer. Therefore, when enantiopure materials are described herein as "ha[ving] the following structure" or "ha[ving] one of the following structures", it is understood that the indicated structure is the enantiomer that appears in excess, and that an amount (e.g., 5% or less) of the minor enantiomer, which has a different structure, may be present.

In some embodiments, the allylic substituted cyclopentene (i) is an enantiopure allylic substituted cyclopentene, (ii) has a structure according to Formula I, wherein $R^1$ is hydrogen, and (iii) has the following structure:

In some embodiments, the allylic substituted cyclopentene (i) is an enantiopure allylic substituted cyclopentene, (ii) has a structure according to Formula I, wherein $R^1$ is hydrogen, and (iii) has the following structure:

In some embodiments, the allylic substituted cyclopentene has a structure according to Formula II, wherein each of $R^2$, $R^3$, and $R^4$ is an unsubstituted $C_1$ hydrocarbyl. In some embodiments, the allylic substituted cyclopentene has a structure according to Formula II, wherein each of $R^2$, $R^3$, and $R^4$ is an unsubstituted $C_1$ hydrocarbyl, and the allylic substituted cyclopentene is a racemic allylic substituted cyclopentene having the following structure:

In some embodiments, the allylic substituted cyclopentene has a structure according to Formula II, wherein each of $R^2$, $R^3$, and $R^4$ is an unsubstituted $C_1$ hydrocarbyl, and the allylic substituted cyclopentene is an enantiopure allylic substituted cyclopentene having the following structure:

In some embodiments, the allylic substituted cyclopentene has a structure according to Formula II, wherein each of $R^2$, $R^3$, and $R^4$ is an unsubstituted $C_1$ hydrocarbyl, and the allylic substituted cyclopentene is an enantiopure allylic substituted cyclopentene having the following structure:

In some embodiments, the allylic substituted cyclopentene has a structure according to Formula II, wherein each of $R^2$, $R^3$, and $R^4$ is an unsubstituted $C_2$ hydrocarbyl. In some embodiments, the allylic substituted cyclopentene has a structure according to Formula II, wherein each of $R^2$, $R^3$, and $R^4$ is an unsubstituted $C_2$ hydrocarbyl, and the allylic substituted cyclopentene is a racemic allylic substituted cyclopentene having the following structure:

In some embodiments, the allylic substituted cyclopentene has a structure according to Formula II, wherein each of $R^2$, $R^3$, and $R^4$ is an unsubstituted $C_2$ hydrocarbyl, and the allylic substituted cyclopentene is an enantiopure allylic substituted cyclopentene having the following structure:

In some embodiments, the allylic substituted cyclopentene has a structure according to Formula II, wherein each of $R^2$, $R^3$, and $R^4$ is an unsubstituted $C_2$ hydrocarbyl, and the allylic substituted cyclopentene is an enantiopure allylic substituted cyclopentene having the following structure:

Methods of Polymerization and Polymers

Also provided herein are methods of polymerization, including methods of polymerizing an allylic substituted cyclopentene as disclosed herein. In some embodiments, the methods include contacting an allylic substituted cyclopentene with a catalyst to form a polymer.

In some embodiments, the polymer has a structure that is at least 80% trans. In some embodiments, the polymer has a structure that is at least 85% trans. In some embodiments, the polymer has a structure that is at least 90% trans. In some embodiments, the polymer has a structure that is at least 95% trans. The trans percentage may be determined using the methods described in the examples, including Example 4.

In some embodiments, the polymer has a configuration that is at least 70% head-to-tail. In some embodiments, the polymer has a configuration that is at least 80% head-to-tail. In some embodiments, the polymer has a configuration that is at least 85% head-to-tail. In some embodiments, the polymer has a configuration that is at least 90% head-to-tail. In some embodiments, the polymer has a configuration that is at least 95% head-to-tail. The head-to-tail percentage may be determined using the methods described in the examples, including Example 4.

As used herein, the phrases "head-to-tail", "head-to-head", and "tail-to-tail" refer to positional isomers of the polymers described herein. The positional isomers have different structures due to the fact that one "end" of a monomer (i.e., a head end or tail end) may be covalently bonded to one of two ends (i.e., a head end or tail end) of an adjacent monomer. The polymers described herein may include any one of the positional isomers, any two of the positional isomers, or all three of the positional isomers.

Examples of "head-to-tail", "head-to-head", and "tail-to-tail" positional isomers that may be present in a polymer formed from a monomer of Formula I are depicted below:

In some embodiments, the catalyst used in the methods described herein includes an olefin metathesis catalyst. The olefin metathesis catalyst may include ruthenium. The olefin metathesis catalyst may include a transition metal carbene complex, such as Grubbs' catalyst. The transition metal carbene complex may include ruthenium. In some embodiments, the catalyst includes a Hoveyda-Grubbs $2^{nd}$ Generation Catalyst (HG2).

In some embodiments, the contacting occurs in toluene, but generally the contacting may occur in any solvent that does not undesirably inhibit the polymerization.

Not wishing to be bound by any particular theory, it is believed that increasing the steric bulk of allylic substituents on CP monomers amenable to ROMP results, in some embodiments, in a precise microstructure with up to 96% trans and 92% head-to-tail (HT) insertion as determined by NMR. It is believed that, in some embodiments, enantiomeric enrichment of chiral monomers can produce new polypentenamers with precise branch periodicity along the backbone (x=5) in addition to highly isotactic stereochemistry. Such materials can add an unexplored component to the expanding structure-property genome of polyolefins and may, in some embodiments, supply new materials with superior and/or highly reproducible properties when compared to polyolefins derived by copolymerization strategies.

The phrase "$C_1$-$C_{30}$ hydrocarbyl" and the like, as used herein, generally refers to an aliphatic group, an aromatic or aryl group, a cyclic group, or any combination thereof; any substituted derivative thereof, including but not limited to any halide-, alkoxide-, or amide-substituted derivative thereof; or hydrogen. Also included in the definition of the $C_1$-$C_{30}$ hydrocarbyl are any unsubstituted, branched, or linear analogs thereof. The $C_1$-$C_{30}$ hydrocarbyl may be substituted with one or more functional moieties selected from a halide, an ether, a ketone, an ester, an amide, a nitrile, a heterocycle comprising at least one N-, O-, or S-heteroatom, an aldehyde, a thioether, an imine, a sulfone, a carbonate, a urethane, a urea, or an imide. The $C_1$-$C_{30}$ hydrocarbyl also may include one or more silicon atoms.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from 1 to about 30 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl.

Examples of aryl or aromatic moieties include, but are not limited to, anthracenyl, azulenyl, biphenyl, fluorenyl, indan, indenyl, naphthyl, phenanthrenyl, phenyl, 1,2,3,4-tetrahydro-naphthalene, and the like, including substituted derivatives thereof, in each instance having from 3 to 30 carbons. Substituted derivatives of aromatic compounds include, but are not limited to, tolyl, xylyl, mesityl, and the like, including any heteroatom substituted derivative thereof. Examples of cyclic groups, in each instance, include, but are not limited to, cycloparaffins, cycloolefins, cycloacetylenes, arenes such as phenyl, bicyclic groups and the like, including substituted derivatives thereof, in each instance having from about 3 to about 30 carbon atoms. Thus heteroatom-substituted cyclic groups such as furanyl are also included herein.

In each instance, aliphatic and cyclic groups are groups comprising an aliphatic portion and a cyclic portion, examples of which include, but are not limited to, groups such as: —$(CH_2)_m C_6 H_q M_{5-q}$ wherein m is an integer from 1 to 10, q is an integer from 1 to 5, inclusive; —$(CH_2)_m C_6 H_q R_{10-q}$ wherein m is an integer from 1 to about 10, q is an integer from 1 to 10, inclusive; and —$(CH_2)_m C_5 H_q R_{9-q}$ wherein m is an integer from 1 to about 10, q is an integer from 1 to 9, inclusive. In each instance and as defined above, M and R are independently selected from: an aliphatic group; an aromatic group; a cyclic group; any combination thereof; any substituted derivative thereof, including but not limited to any halide-, alkoxide-, or amide-substituted derivative thereof; any one of which has from 1 to about 30 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$CH_2CH_2C_6H_4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer thereof, or any substituted derivative thereof. Thus, a cyclic group refers to groups such as $C_6H_qM_{5-q}$, $C_6H_qM_{10-q}$, $C_5H_qR_{9-q}$, and the like, where q, M, and R are defined immediately above.

In each instance, the heterocycle comprising at least one N-, O-, or S-heteroatom may be selected from the group consisting of: morpholinyl, thiomorpholinyl, thiomorpholinyl S-oxide, thiomorpholinyl S,S-dioxide, piperazinyl, homopiperazinyl, pyrrolidinyl, pyrrolinyl, tetrahydropyranyl, piperidinyl, tetrahydrofuranyl, tetrahydrothienyl, homopiperidinyl, homomorpholinyl, homothiomorpholinyl, homothiomorpholinyl S,S-dioxide, oxazolidinonyl, dihydropyrazolyl, dihydropyrrolyl, dihydropyrazinyl, dihydropyridinyl, dihydropyrimidinyl, dihydrofuryl, dihydropyranyl, tetrahydrothienyl S-oxide, tetrahydrothienyl S,S-dioxide, and homothiomorpholinyl S-oxide, pyridinyl, pyrimidinyl, quinolinyl, benzothienyl, indolyl, indolinyl, pyridazinyl, pyrazinyl, isoindolyl, isoquinolyl, quinazolinyl, quinoxalinyl, phthalazinyl, imidazolyl, isoxazolyl, pyrazolyl, oxazolyl, thiazolyl, indolizinyl, indazolyl, benzothiazolyl, benzimidazolyl, benzofuranyl, furanyl, thienyl, pyrrolyl, oxadiazolyl, thiadiazolyl, triazolyl, tetrazolyl, oxazolopyridinyl, imidazopyridinyl, isothiazolyl, naphthyridinyl, cinnolinyl, carbazolyl, beta-carbolinyl, isochromanyl, chromanyl, tetrahydroisoquinolinyl, isoindolinyl, isobenzotetrahydrofuranyl, isobenzotetrahydrothienyl, isobenzothienyl, benzoxazolyl, pyridopyridinyl, benzotetrahydrofuranyl, benzotetrahydrothienyl, purinyl, benzodioxolyl, triazinyl, phenoxazinyl, phenothiazinyl, pteridinyl, benzothiazolyl, imidazopyridinyl, imidazothiazolyl, dihydrobenzisoxazinyl, benzisoxazinyl, benzoxazinyl, dihydrobenzisothiazinyl, benzopyranyl, benzothiopyranyl, coumarinyl, isocumarinyl, chromonyl, chromanonyl, pyridinyl-N-oxide, tetrahydroquinolinyl, dihydroquinolinyl, dihydroquinolinonyl, dihydroisoquinolinonyl, dihydrocumarinyl, dihydroisocumarinyl, isoindolinonyl, benzodioxanyl, benzoxazolinonyl, pyrrolyl N-oxide, pyrimidinyl N-oxide, pyridazinyl N-oxide, pyrazinyl N-oxide, quinolinyl N-oxide, indolyl N-oxide, indolinyl N-oxide, isoquinolyl N-oxide, quinazolinyl N-oxide, quinoxalinyl N-oxide, phthalazinyl N-oxide, imidazolyl N-oxide, isoxazolyl N-oxide, oxazolyl N-oxide, thiazolyl N-oxide, indolizinyl N-oxide, indazolyl N-oxide, benzothiazolyl N-oxide, benzimidazolyl N-oxide, pyrrolyl N-oxide, oxadiazolyl N-oxide, thiadiazolyl N-oxide, triazolyl N-oxide, tetrazolyl N-oxide, benzothiopyranyl S-oxide, or benzothiopyranyl S,S-dioxide.

Unless otherwise indicated, the term "substituted," when used to describe a chemical structure or moiety, refers to a derivative of that structure or moiety wherein one or more of its hydrogen atoms is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O— alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, oxo, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

In the descriptions provided herein, the terms "includes," "is," "containing," "having," and "comprises" are used in an open-ended fashion, and thus should be interpreted to mean "including, but not limited to." When structures or methods are claimed or described in terms of "comprising" various components or processing features, the structures and methods can also "consist essentially of" or "consist of" the various components or processing features, unless stated otherwise.

The terms "a," "an," and "the" are intended to include plural alternatives, e.g., at least one. For instance, the disclosure of "a monomer," "a catalyst," and the like, is meant to encompass one, or mixtures or combinations of more than one monomer, catalyst, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that "the polymer has a structure that is at least 95% trans." This range should be interpreted as encompassing values in a range of about 95% to 100%, and further encompasses "about" each of 96%, 97%, 98%, and 99%, including any ranges and sub-ranges between any of these values.

The processes described herein may be carried out or performed in any suitable order as desired in various implementations. Additionally, in certain implementations, at least a portion of the processes may be carried out in parallel. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

The following materials were used in the examples provided herein. Acetyl chloride (≥99.0%), basic alumina, chloroform-d, chlorotriethylsilane (TESCl) (99%), chlorotrimethylsilane (TMSCl) (99%), diisobutylaluminum hydride (DIBAL) solution (1.0 M in methylene chloride), 4-(dimethylamino)pyridine (DMAP) (≥99%), ethyl vinyl ether (99%), Hoveyda-Grubbs Catalyst 2nd Generation (HG2) (97%), imidazole (99%), magnesium sulfate (>99%), N,N-dicyclohexylcarbodiimide (DCC) (99%), pyridine (≥99.0%), (R)-(+)-α-methoxy-α-trifluoromethylphenylacetic acid (for chiral derivatization, ≥99.0%), (1R,2R)-(−)-1,2-diaminocyclohexane (98%), sodium bicarbonate, and sodium sulfate were purchased from Sigma-Aldrich and used as received unless otherwise noted. 2-(diphenylphosphino)benzoic acid (97%), N1-((ethylimino)methylene)-N3,N3-dimethylpropane-1,3-diamine hydrochloride (95%) and tris(dibenzylideneacetone)-dipalladium(0)-chloroform (>95%), were purchased from OCHEM and used as received. 2-Cyclopenten-1-one was purchased from Oakwood Chemicals and used as received. Potassium bicarbonate was purchased from Mallinckrodt Chemicals and used as received. Dry toluene and dichloromethane (DCM) were obtained from an SG Waters glass contour solvent purification system that was packed with neutral alumina and the solvents were passed through a 2 μm filter prior to being dispensed.

The $^1$H and $^{13}$C NMR experiments of the following examples were conducted on a Bruker Advance III 400, 500, or 600 MHz Spectrometer. The polymers of the following examples were characterized on an Agilent-Wyatt combination triple detection size exclusion chromatography (SEC) instrument containing 3 successive Agilent PLgel Mixed-C columns, an Agilent 1260 infinity series pump, degasser, autosampler, and thermostatted column chamber. The Wyatt triple detection unit hosted a mini-Dawn TREOS 3-angle light scattering detector, Optilab TrEX refractive index detector, and a Viscostar II differential viscometer.

In the following examples, molar mass and dispersities were determined by a 10-point universal calibration with narrow dispersity polystyrene standards varying from 0.580 to 7,500 kDa. Optical rotation was determined at known concentrations between 2 and 5 mg mL$^{-1}$ in DCM at 25° C. using a Jasco P-2000 polarimeter with a wavelength of 589 nm and a quartz cell with a path length of 1 dm. Specific optical rotations were acquired after a minimum of five scans to ensure reading stability.

Gas Chromatography with electron ionization mass spectrometry (GC-EI/MS) was performed in the following examples, and samples (1-3 μL) were diluted in 1 mL of chloroform prior to analysis. Thermogravimetric Analysis (TGA) was performed on a TA Instruments model Q50, under argon atmosphere. Samples were held isothermal at 100° C. for 10 min, then ramped to 750° C. at a rate of 10° C. min. Differential Scanning calorimetry (DSC) experiments were performed from on a Thermal Analyzer (Model Q100 TA Instruments) using a heating rate of 20° C. min$^{-1}$ under N$_2$ flow (40 mL min$^{-1}$) followed by cooling at 20° C. min$^{-1}$ with an RCS cooler (Model RCS90, refrigerated cooling system).

Example 1—Synthesis of 2-Cyclopentenol (rac-1)

To a 500 mL flame dried round bottom flask equipped with a Teflon coated stir bar, 9.00 g (110 mmol) of 2-cyclopenten-1-one and 150 mL of anhydrous DCM were added. The solution was then cooled to 0° C. and 150 mL of a 1M solution of DIBAL in DCM was added in 50 mL portions over 30 minutes. The solution was stirred for 5 h at 23° C.

The solution was then cooled to 0° C. and diluted with 150 mL of DCM. The reaction was quenched by the dropwise addition of 130 mL of a 10:3 mixture of H$_2$O:MeOH in 20 mL portions over 45 minutes. This solution was then left to stir for 4 h.

Figure 1:
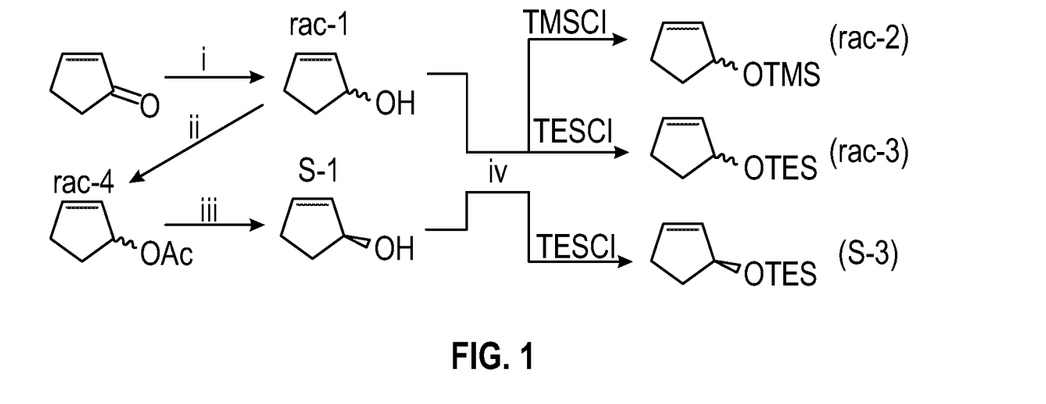
FIG. 1 depicts embodiments of synthetic schemes for producing embodiments of chiral and achiral allylic substituted cyclopentene monomers.

After phase separation, the organic layer was collected and washed with 200 mL of H$_2$O twice a followed by drying over Na$_2$SO$_4$ and decantation. After concentration via rotatory evaporation, the compound was purified by reduced vacuum distillation at 60° C. to yield 6.72 g (79.90 mmol, 72.6% yield) of rac-1 (FIG. 1).

$^1$H NMR (400 MHz, CDCl$_3$) δ (ppm): 6.02-5.95 (m, 1H), 5.86 (dt, J=5.6, 2.2 Hz, 1H), 4.86 (dddd, J=6.0, 3.8, 2.5, 1.3 Hz, 1H), 2.59-2.43 (m, 1H), 2.34-2.18 (m, 2H), 2.02 (s, 1H), 1.80-1.61 (m, 1H). $^{13}$C NMR (150 MHz, CDCl$_3$) δ (ppm): 134.99, 133.31, 77.48, 33.24, 30.95. GC-EI/MS (m/z) calcd 84.11 found 84.07.

Example 2—Synthesis of 3-Trimethylsiloxycyclopentene (rac-2)

To a 500 mL flame dried round bottom flask equipped with a Teflon coated stir bar, 3.00 g (35.70 mmol) of rac-1 and 350 mL of anhydrous DCM were added followed by argon sparging for 5 min. 12.12 g (178.0 mmol) of imidazole and 13.58 mL (107 mmol) of TMSCl were added at 0° C. and stirred for 15 minutes followed by refluxing for 12 h.

The reaction was then cooled to 22° C. and filtered. The filtrate was washed twice with 150 mL of H$_2$O, collected, dried over NaSO$_4$, and concentrated via rotatory evaporation.

The crude product was then purified by column chromatography with 95:5 pentane:DCM mobile phase. Final solvent removal yielded 2.21 g (14.1 mmol, 39.6% yield) of pure rac-2 as a colorless oil (FIG. 1).

$^1$H NMR (400 MHz, CDCl$_3$) δ (ppm) 5.92 (dtd, J=5.8, 2.3, 1.2 Hz, 1H), 5.72 (dq, J=6.1, 2.0 Hz, 1H), 4.89 (dddd, J=6.1, 4.8, 3.7, 1.9 Hz, 1H), 2.56-2.43 (m, 1H), 2.29-2.13 (m, 2H), 1.73-1.62 (m, 1H), 0.14 (s, 9H). $^{13}$C NMR (150 MHz, CDCl$_3$) δ (ppm) 133.94, 133.55, 77.62, 33.32, 31.01, 0.22. GC-EI/MS (m/z) calcd 156.26 found 156.10.

Example 3—3-Triethylsiloxycyclopentene (rac-3)

The same procedure for the synthesis and purification of rac-2 (Example 2) was followed to produce rac-3 with the exception that TESCl was used instead of TMSCl. The product was then purified to yield rac-3 as a colorless oil. 2.73 g (13.8 mmol, 38.6% yield)(FIG. 1).

$^1$H NMR (400 MHz, CDCl$_3$) δ (ppm): 5.93-5.89 (m, 1H), 5.72 (dq, J=5.9, 2.1 Hz, 1H), 4.89 (ddt, J=6.9, 3.7, 1.8 Hz, 1H), 2.54-2.43 (m, 1H), 2.27-2.15 (m, 2H), 1.75-1.62 (m, 1H), 0.97 (t, J=7.9 Hz, 9H), 0.62 (q, J=7.9 Hz, 6H). $^{13}$C NMR (150 MHz, CDCl$_3$) δ (ppm): 133.77, 133.72, 77.66, 33.52, 31.03, 6.79, 4.85. GC-EI/MS (m/z) calcd 198.26 found 198.15.

Example 4—Microstructural Outcomes of Racemic Monomers

The microstructural outcomes of the racemic monomers of Examples 1-3 were explored: cyclopent-2-en-1-ol (rac-1)(Example 1), 3-trimethylsiloxycyclopentene (rac-2)(Example 2), and 3-triethylsiloxycyclopentene (rac-3)(Example 3)(FIG. 1).

Respectively, these monomers contained an allylic substituent with increasing steric bulk. Although prior computational analysis on rac-1 concluded a sufficient ring-strain for ROMP (ΔH=−6.50 kcal mol$^{-1}$)(R. Tuba, et al., *Macromolecules*, 2014, 47, 8190-8195), no experimental success for the polymerization of rac-1 is believed to have been reported. This is also believed to be true for rac-2 and rac-3, which have never been reported experimentally or theoretically. The synthetic scheme to produce rac-1 from DIBAL reduction of cyclopentenone followed by alcohol protection with chlorotrimethylsilane (TMSCl) or chlorotriethylsiloxane (TESCl) to afford rac-2 and rac-3, respectively, is depicted at FIG. 1, wherein the following conditions were used: i) DIBAL, DCM, 0° C. ii) DMAP, pyridine, acetyl chloride, DCM, 0° C. iii) Pd$_2$(dba)$_3$, DCM:H$_2$O (9:1), KHCO$_3$, DACH-phenyl Trost ligand, 22° C. and iv) imidazole, DCM, TMSCl (or TESCl), 35° C.

Figure 2:
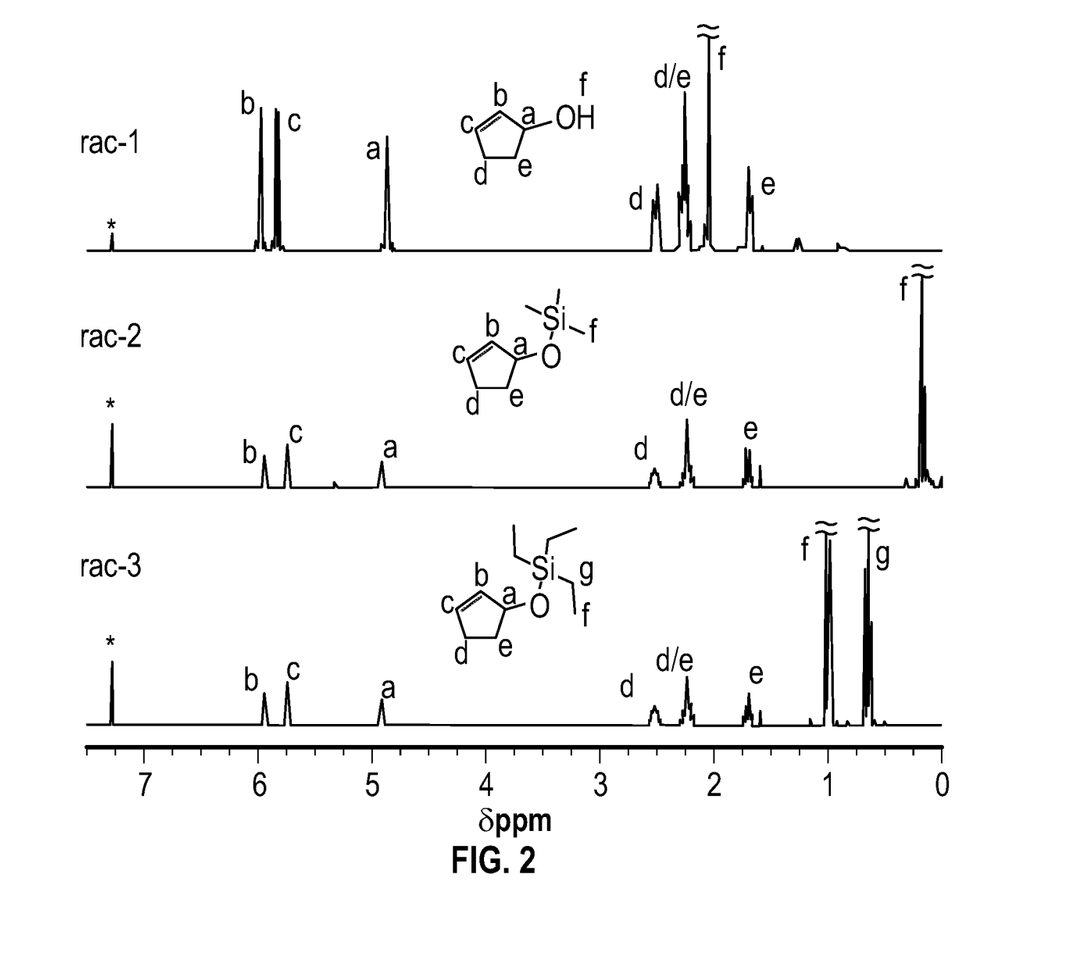
FIG. 2 depicts stacked $^1$H NMR spectra for three embodiments of cyclopentene monomers.

Each of these monomers was successfully synthesized and FIG. 2 depicts their stacked $^1$H-NMR spectra after purification.

ROMP of each monomer was performed using Hoveyda-Grubbs 2$^{nd}$ Generation catalyst (HG2) in toluene at −10° C.

Successful polymerization of rac-1 produced poly(rac-1) as a white solid that was marginally soluble in toluene, while crude and completely insoluble in toluene once precipitated from acetone and dried.

ROMP of rac-2 and rac-3 was also successful under the foregoing conditions and produced poly(rac-2) and poly(rac-3) as gummy colorless solids.

All polymerizations were conducted for up to 4 hours followed by cold termination via the addition of excess ethyl vinyl ether and stirring at −10° C. for 30 minutes. Residual catalyst was successfully removed with a short plug of basic alumina.

While poly(rac-2) and poly(rac-3) were soluble in a variety of medium-to-low polarity solvents (e.g., toluene, tetrahydrofuran, DCM, and CHCl$_3$), the increased polarity resulting from the alcohol substituent on poly(rac-1) made this material only soluble in higher polarity solvents, such as DMF.

Size exclusion chromatography (SEC) using THF as the mobile phase was capable of determining the molar mass and dispersity (Đ) for poly(rac-2) (M$_n$=41.6 kg mol$^{-1}$, Đ=2.07), and poly(rac-3) (M$_n$=22.3 kg mol$^{-1}$, Đ=2.56), based on conventional column calibration with polystyrene standards.

Figure 3:
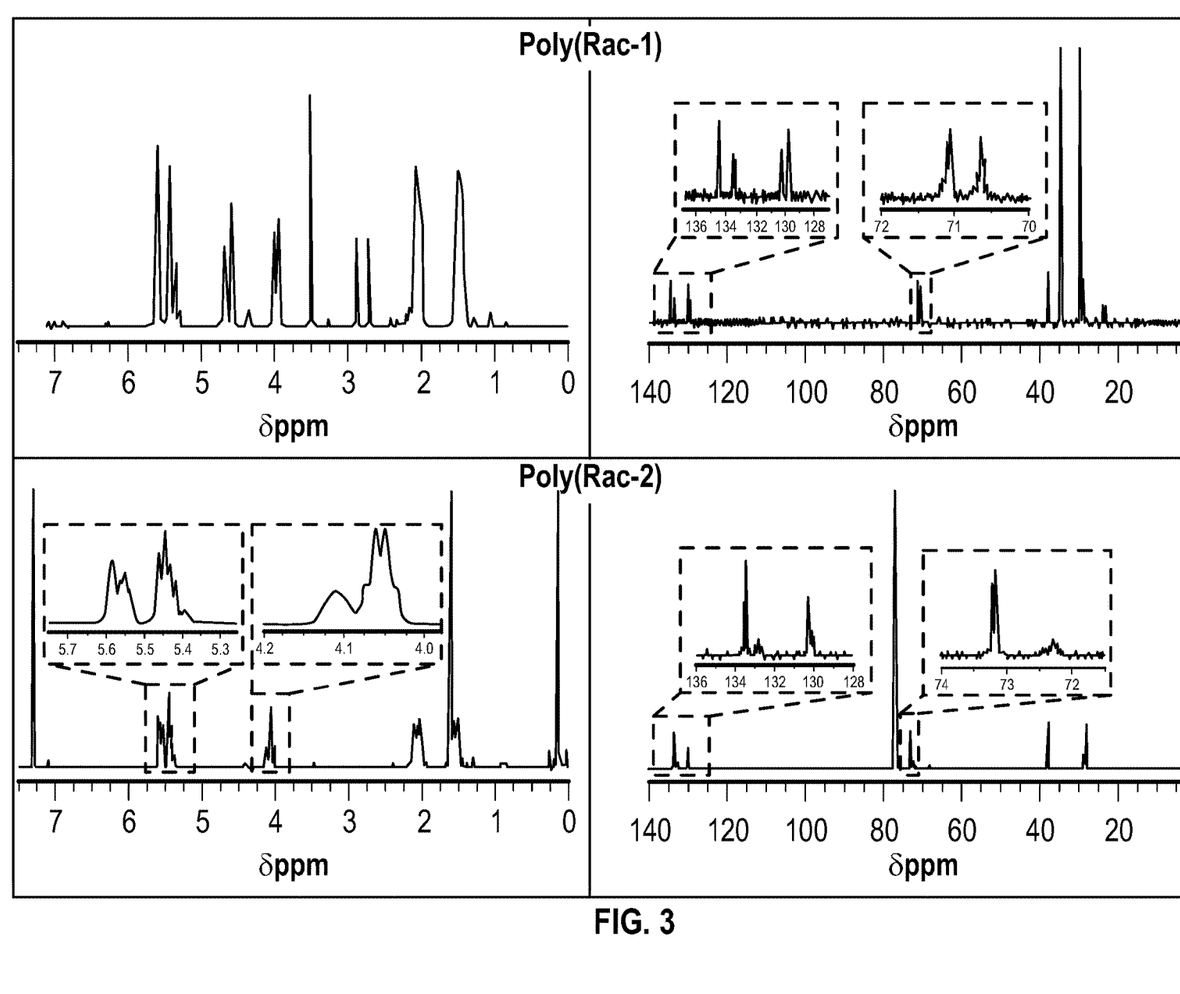
FIG. 3 depicts stacked $^1$H (left column) and $^{13}$C NMR (right column) spectra for three embodiments of polymers derived from three embodiments of cyclopentene monomers.

Appropriate deuterated solvents (CDCl$_3$ or DMF-d$_7$) were used to dissolve each polymer and analyze the microstructural outcomes by NMR spectroscopy. FIG. 3 displays stacked $^1$H (left column) and $^{13}$C NMR (right column) spectra for poly(rac-1) in DMF-d$_7$, poly(rac-2) in CDCl$_3$, and poly(rac-3) in CDCl$_3$. The left insets of FIG. 3 highlight regions associated with backbone olefins, while right insets amplify the peaks associated with the methane region of the backbone.

Insight into the microstructural regularity from ROMP of allylic substituted monomers was possible through observation of the carbon and proton shifts associated with the backbone olefins (left insets of FIG. 3) and the methine group (right insets of FIG. 3) of each spectrum. Combined, these provided qualitative and quantitative conclusions on the cis/trans population in addition to head-to-tail (HT), head-to-head (HH) and tail-to-tail positional isomers.

First, the $^{13}$C NMR olefin signals between 129 and 135 ppm were particularly informative as a high degree of structural irregularity was expected to provide up to eight olefin signals while only two signals were expected for a perfectly regioregular polymer (i.e., all cis or trans and all HT).

Observation of these signals suggested a promising outcome for poly(rac-3), as only two dominant signals were observed at 130.4 ppm and 133.4 ppm. A more quantitative measure of structural regularity was provided by integration of respective methine signals by $^1$H NMR, which were well resolved for a cis olefin (4.34-4.43 ppm) versus trans olefin (3.96-4.13 ppm).

Furthermore, within the trans signal region, resolved peaks for trans-HT and trans-HH regioisomers were also comparable for quantifying regioregularity. As quantified through a deconvolution of the relevant peaks of FIG. 3, poly(rac-1) was determined to be 91% trans but only 57% HT.

This appeared to be consistent with the $^{13}$C NMR analysis of poly(rac-1) because multiple signals were observed in both the olefin (130 ppm-134 ppm) and methine carbon (72 ppm-72 ppm) regions. When the hydroxyl substituent was protected with bulky TMS on poly(rac-2), a slight improvement of regioregularity was calculated (94% trans and 68% HT preference).

However, when the bulk of the protecting group was increased with TES, poly(rac-3) exhibited a highly regular microstructure with 96% trans and 92% HT. Furthermore, a well resolved dd and dt was observed for the olefin $^1$H NMR signals (FIG. 3, poly(rac-3), left inset) that had a coupling constant of 15.4 Hz, which was consistent with the trans confirmation.

In view of the foregoing results for poly(rac-3), a series of ROMP investigations was performed to further elucidate the kinetics and thermodynamics for this system. A possible consequence of low ring-strain monomers was that equilibrium polymerization thermodynamics became highly sensitized to monomer concentration and temperatures.

A set of polymerizations in toluene at −10° C. using HG2 catalyst (0.58±0.02 mol %) and varying rac-3 concentration (2.5, 3.0, 3.5, and 4.0 M) was performed and aliquots were terminated at known time intervals by injection into cold (−10° C.) solutions of CDCl$_3$ that included excess ethyl vinyl ether.

The crude aliquots were then analyzed by $^1$H NMR and percent conversions (Table 1) were determined by comparison of monomer and polymer olefin proton signals integrations. Equilibrium of monomer conversions for these polymerizations was established in approximately 150 minutes.

TABLE 1

Aliquot characterization of Poly(rac-3) at 2.5M with HG2 at −10° C.

| Time (minutes) | Conversion % |
|---|---|
| 31.5 | 4.8 |
| 52.33 | 14.5 |

TABLE 1-continued

Aliquot characterization of Poly(rac-3) at 2.5M with HG2 at −10° C.

| Time (minutes) | Conversion % |
|---|---|
| 90 | 33.1 |
| 116 | 33.3 |
| 157 | 33.3 |

Figure 4:
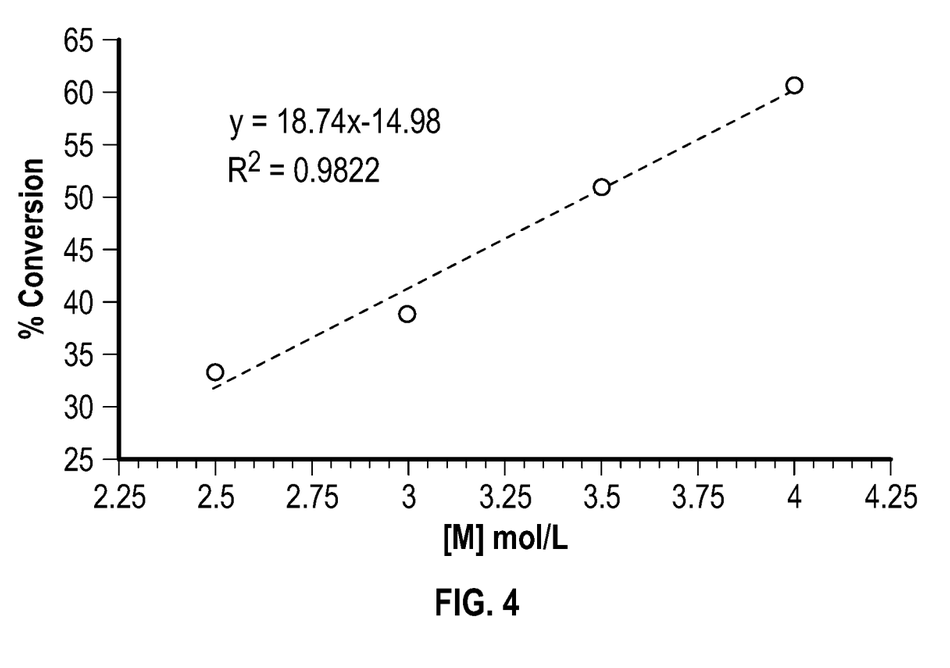
FIG. 4 depicts the equilibrium monomer conversion percentage of an embodiment of a ring opening metathesis polymerization.

FIG. 4 displays a linear plot of equilibrium percent monomer conversion as a function of initial monomer concentration. Extrapolation of the linear fit determined that the highest monomer conversion possible for rac-3 at −10° C. was likely about 69% based on bulk monomer concentration of rac-3 (4.52 M), which was based on monomer density of 0.895 g cm$^{-3}$, as determined by gravimetric analysis of known volumes at 22° C.

Further analysis of the aliquots by SEC revealed that the number average molar mass increased with conversion, while dispersities decreased (Table 2).

TABLE 2

Results of rac-3 ROMP at varying initial concentrations.

| [rac-3]$_0$ (mol L$^{-1}$)$^a$ | % conversion$^b$ | M$_n$ (kg mol$^{-1}$)$^c$ | Đ$^c$ |
|---|---|---|---|
| 2.5 | 33.3 | 19.8 | 3.24 |
| 3.0 | 38.9 | 21.1 | 3.12 |
| 3.5 | 51.0 | 26.3 | 2.98 |
| 4.0 | 60.5 | 30.2 | 2.56 |

$^a$initial rac-3 concentration in toluene at −10° C. using HG2 catalyst (0.58 ± 0.02 mol %).
$^b$Determined by $^1$H NMR spectroscopy of crude polymerizations terminated after reaching equilibrium (FIG. S50).
$^c$Determined by SEC analysis based on conventional column calibration with polystyrene standards.

The relatively high dispersities for these samples coupled with the fact that they decreased with conversion indicated that initiation for these systems was slow compared to propagation. This likely was caused by the low polymerization temperature and the more stringent selectivity of collision (distal approach) to initiate the polymerization which may have been exacerbated by the initial bulky isopropoxyphenyl alkylidene on the HG2 catalyst.

To elevate the level of microstructural precision and obtain highly regioregular and highly isotactic branching, the synthesis of an enantiopure version of rac-3 (Scheme 1) was performed.

Example 5—Cyclopentene-3-acetate (rac-4)

A 250 mL flame dried round bottom flask equipped with a Teflon coated stir bar was charged with 6.00 g (71.3 mmol) of rac-1, 125 mL of anhydrous DCM, 2.18 g of DMAP (17.8 mmol) and 8.65 mL (107 mmol) of pyridine.

After argon sparging, the solution was cooled to 0° C. and 10.14 mL (143 mmol) of acetyl chloride was added over a period of 10 minutes. The reaction was gradually warmed to room temperature and stirred for 12 h followed dilution with 150 mL of DCM and multiple 50 mL washes with 1.0 M HCl, then NaHCO$_3$, then brine.

The organic layer was then collected, dried over MgSO$_4$, decanted, and concentrated via rotatory evaporation. The crude product was purified by column chromatography (100:1 pentane:ether) then concentrated to yield rac-4 as a light yellow oil 5.13 g (40.6 mmol, 57.0% yield)(FIG. 1).

$^1$H NMR (400 MHz, CDCl$_3$) δ (ppm): 6.10 (dtd, J=5.7, 2.2, 1.0 Hz, 1H), 5.82 (dq, J=6.2, 2.1 Hz, 1H), 5.69 (dddd, J=9.5, 4.5, 2.2, 1.0 Hz, 1H), 2.51 (ddddd, J=13.1, 10.8, 5.2, 3.6, 2.0 Hz, 1H), 2.38-2.21 (m, 2H), 2.03 (s, 3H), 1.88-1.75 (m, 1H). $^{13}$C NMR (150 MHz, CDCl$_3$) δ (ppm) 171.01, 137.52, 129.25, 80.46, 31.05, 29.76, 21.31. GC-EI/MS (m/z) calcd 126.12 found 126.04.

Example 6—(S)-(−)-2-Cyclopentenol (S-1)

Several techniques were available to produce chiral (S)-cyclopent-2-en-1-ol (S-1, FIG. 1), which included asymmetric reduction, kinetic resolution through Sharpless asymmetric epoxidation, and deracemization of allylic esters and carbonates (dynamic resolution).

It was decided to perform the latter, and rac-1 was protected with acetyl chloride to produce the acetoxy-substituted rac-4 followed by dynamic resolution with palladium(0) in the presence of DACH-Trost ligand. It was noted that rac-4 did not undergo ROMP to any appreciable extent at −10° C.

Upon hydrolysis, S-1 was obtained in 41.7% yield. Polarimetry analysis in DCM concluded a 93.0% enantiomeric excess (% ee), based on specific optical rotation of S-1 in literature. To confirm this result, diastereomeric resolution was performed though the Mosher ester analysis and conducted $^1$H and $^{19}$F NMR for the diastereomers produced. This method determined a 90.4% ee, which was in good agreement with the polarimetry analysis.

Specifically, to a flame-dried round bottom equipped with a stir bar, 0.5806 g (0.6 mmol, 4 mol %) of Pd$_2$(dba)$_3$, 0.8758 g (1.3 mmol, 8 mol %) of (R,R)-DACH-Phenyl Trost ligand, and 2.2200 g (22.2 mmol, 1.4 eq.) of KHCO$_3$ were added and sparged with argon. Degassed DCM (285 mL) was added via cannulation and allowed to stir at room temperature for 15 min. The reaction was then cooled to 3° C.

Separately, 2.0000 g (15.9 mmol, 1 eq) of rac-4 was diluted with 1 mL of DCM and sparged with argon. The solution was injected into the reaction mixture with a syringe while simultaneously injecting another syringe containing 32 mL of argon sparged water. The reaction was stirred at 3° C. for 24 h. The solution was diluted with 1 L of 1:1 pentane:diethyl ether and the palladium and water were removed by running the solution through a plug of silica gel.

After concentration, the crude product was purified by column chromatography (2:1 pentane:diethyl ether) collected and concentrated to yield S-1 as a light yellow oil. 0.5556 g (6.6 mmol, 41.7% yield).

Specific optical rotation, [α]$_D^{23}$=−110.36±0.29 (c=2.35 mg mL$^{-1}$ in DCM) concludes 93.0% ee based on the literature (Lüssem, B. J. et al., *J. Am. Chem. Soc.,* 2003, 125, 6066-6067).

$^1$H NMR (400 MHz, CDCl$_3$) δ (ppm): 5.98 (dtd, J=5.5, 2.1, 1.0 Hz, 1H), 5.84 (dt, J=5.7, 2.2 Hz, 1H), 4.87 (m, 1H), 2.51 (m, 1H), 2.26 (m, 2H), 1.69 (m, 1H), 1.44 (s, 1H). $^{13}$C NMR (150 MHz, CDCl$_3$) δ (ppm): 135.33, 133.43, 77.80, 33.49, 31.11. GC-EI/MS (m/z) calcd 84.11. found 84.06.

The Trost ligand was synthesized following previous literature with the following modifications (Trost, B. M. et al., *J. Am. Chem. Soc.,* 1992, 114, 9327-9343; and Fuchs, S., et al., *European Journal of Organic Chemistry,* 2007, 2007, 1145-1152). The brown solid was purified with 97.5:2.5 DCM:MeOH via column chromatography and recrystallized twice from MeCN to yield a white solid. $^1$H NMR (600 MHz, CDCl$_3$) δ (ppm): 7.60-7.55 (m, 2H), 7.35-7.17 (m, 24H), 6.94-6.88 (m, 2H), 6.32 (d, J=6.9 Hz, 2H), 3.82-3.73 (m, 2H), 1.90-1.82 (m, 2H), 1.69-1.61 (m, 2H), 1.28-1.15

(m, 2H), 0.98 (td, J=15.1, 13.8, 6.2 Hz, 2H). $^{13}$C NMR (150 MHz, CDCl$_3$) δ (ppm): 169.29, 140.88, 140.72, 137.84, 137.76, 137.70, 136.73, 136.58, 134.27, 133.95, 133.82, 130.16, 128.75, 128.60, 128.54, 128.51, 128.49, 128.45, 128.40, 53.89, 32.00, 24.66. $^{31}$P NMR (243 MHz, CDCl$_3$) δ −9.78.

Example 7—(S)-3-Triethylsiloxycyclopentene (S-3)

Figure 5:
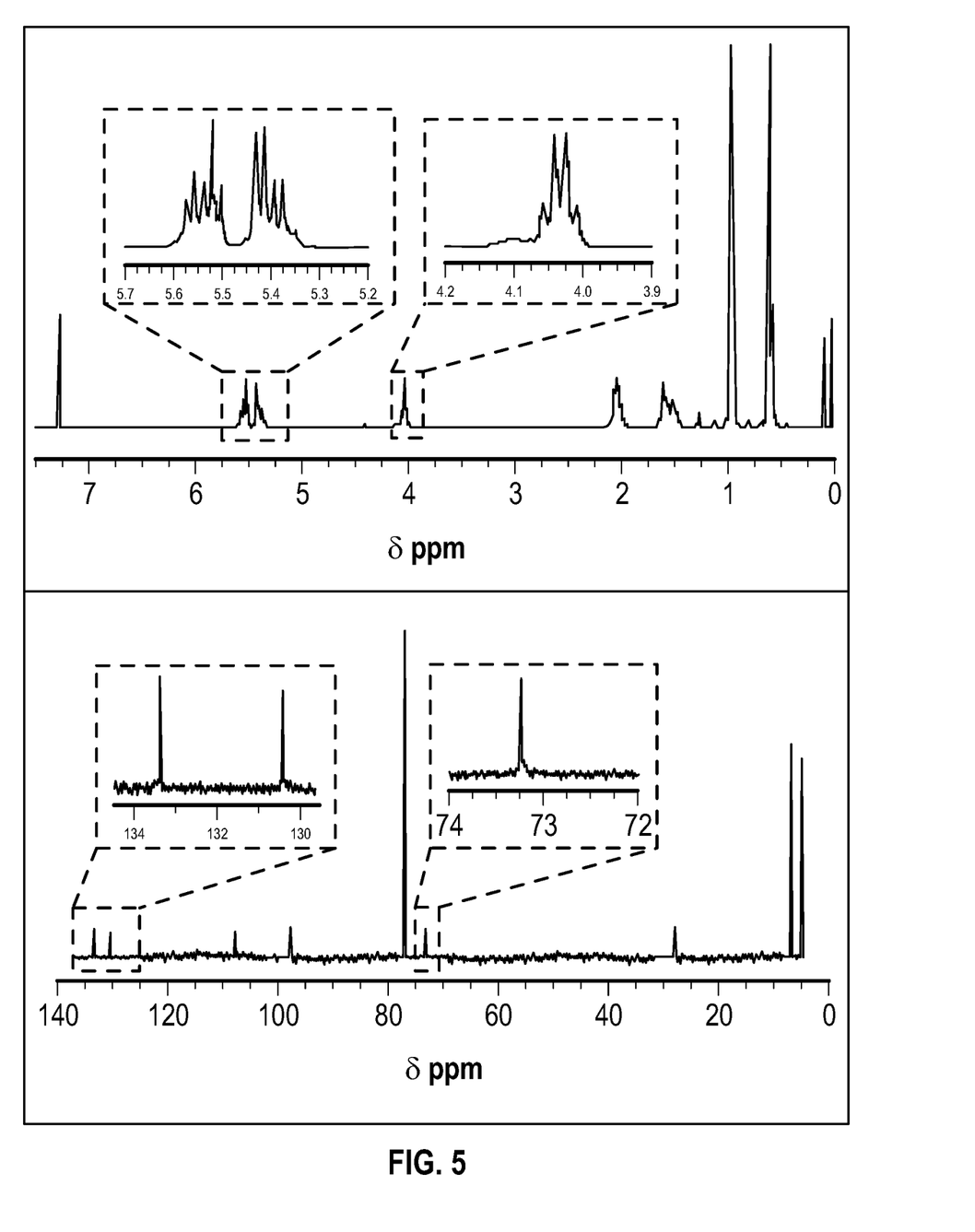
FIG. 5 depicts $^1$H NMR (top) (400 MHz, 25° C.) and $^{13}$C NMR (bottom) spectra of an embodiment of a polymer.

Chiral S-1 was then protected with TESCl to produce the chiral monomer S-3 (FIG. 1). ROMP of S-3 (3 M in toluene) using HG2 (0.57 mol %) at −10° C. successfully produced poly(S-3) ($M_n$=30.2 kg mol$^{-1}$, Đ=2.81) within 2.5 hours. $^1$H and $^{13}$C NMR analysis of poly(S-3) concluded a microstructural outcome consistent with poly(rac-3) with a trans content of 96% and 91% HT regioregularity (FIG. 5). FIG. 5 depicts $^1$H NMR (top) (400 MHz, 25° C.), and $^{13}$C NMR (bottom) of poly(S-3) in CDCl$_3$. The left insets of FIG. 5 highlight signals associated with the olefin regions, while the right insets of FIG. 5 highlight the methane backbone regions.

Figure 6:
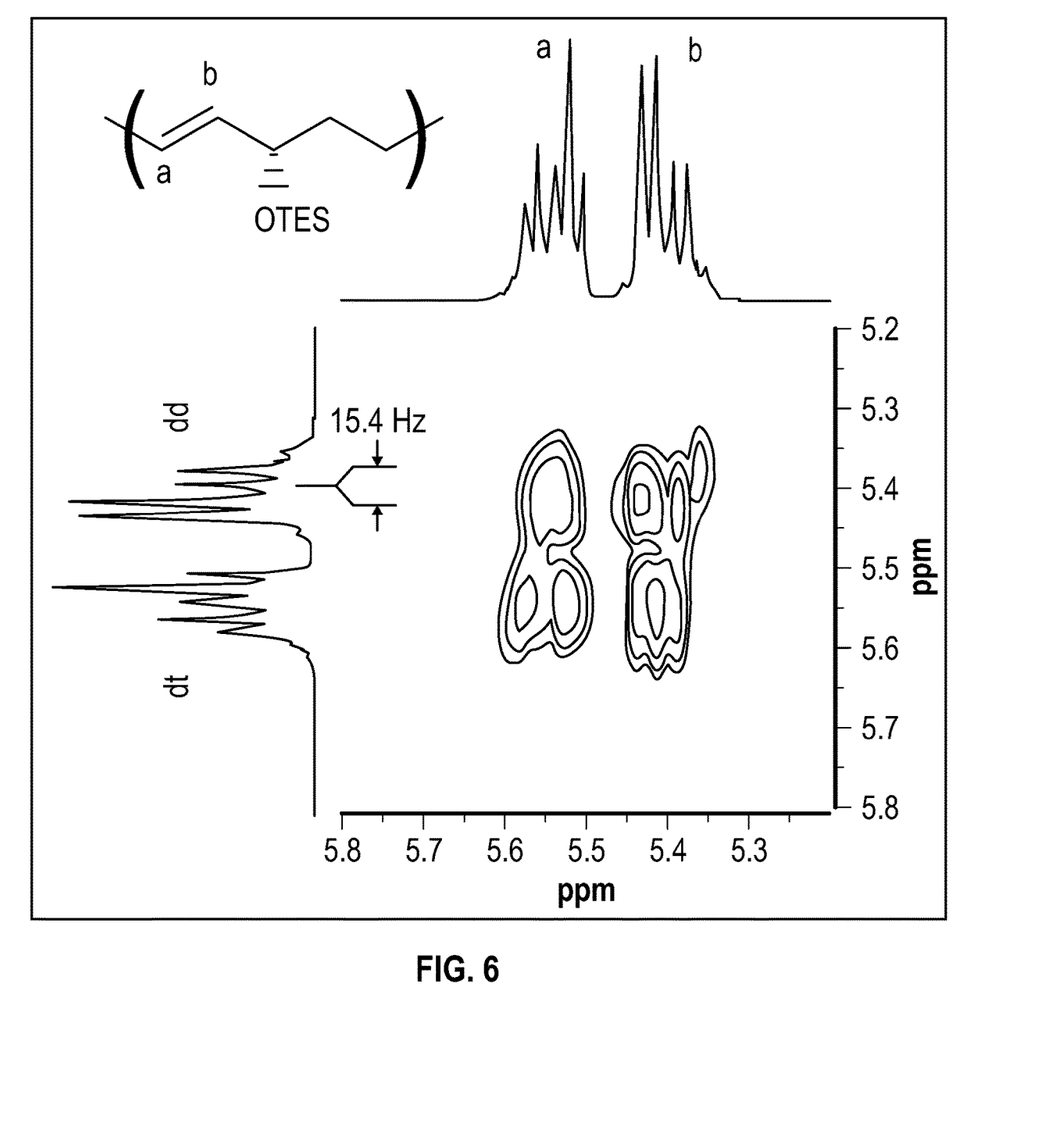
FIG. 6 depicts a $^1$H-$^1$H correlated spectrum of an embodiment of a polymer.

In this example, poly(S-3) also showed an easily resolved coupling constant of 15.4 Hz for the dd olefin proton signal (FIG. 6), which was consistent with the high trans confirmation. FIG. 6 depicts a $^1$H-$^1$H correlated spectrum of poly(S-3) (CDCl$_3$, 25° C., 400 MHz), which highlights the backbone olefin region, which displays (a) a doublet of triplets, dt, and (b) a doublet of doublets, dd, with a coupling constant of 15.4 Hz, which was consistent with trans olefin signals.

This highly isotactic polymer showed a decrease in the specific optical rotation ($[\alpha]_D^{25}$=−6.19±0.11 (c=4.80 mg mL$^{-1}$ in DCM)) compared to monomer ($[\alpha]_D^{23}$=−79.29±0.30° (c=4.35 mg mL$^{-1}$ in DCM)).

The same procedure of the foregoing examples that was used for the synthesis and purification of rac-3 from rac-1 was also used to create S-3 (FIG. 1) from S-1, with the exception that purification by column chromatography was performed with 100:1 hexane:ethyl acetate as the mobile phase.

Yield 0.7481 g (3.8 mmol, 69.3%). $[\alpha]_D^{23}$=−79.29±0.30° (c=4.35 mg mL$^{-1}$ in DCM). $^1$H NMR (400 MHz, CDCl$_3$) δ (ppm) 5.91 (dtd, J=5.7, 2.2, 1.3 Hz, 1H), 5.72 (dq, J=5.8, 2.1 Hz, 1H), 4.93-4.85 (m, 1H), 2.49 (ddtd, J=13.2, 11.6, 4.5, 2.4 Hz, 1H), 2.29-2.11 (m, 2H), 1.67 (ddt, J=12.7, 8.9, 4.7 Hz, 1H), 1.02-0.88 (m, 9H), 0.62 (q, J=7.8 Hz, 6H). $^{13}$C NMR (100 MHz, CDCl$_3$) δ (ppm) 133.91, 133.88, 77.80, 33.66, 31.18, 6.96, 4.98. GC-EI/MS (m/z) expected 198.26 found 198.16.

Example 8—Polymerization Procedure

The polymerization procedures of the foregoing examples were performed according to the following representative example. The synthesis of poly(rac-3) was performed in a 4 mL vial equipped with a Teflon coated stir bar. HG2 catalyst (4.5 mg, 7.2 μmol) was added. The vial was sealed with a septum and purged with argon prior to the injection of 0.14 mL of argon sparged toluene and 0.28 mL (1.26 mmol) of rac-3.

The reaction was stirred at −10° C. for 4 hours followed by addition of 0.2 mL of ethyl vinyl ether and additional stirring for 30 minutes.

A crude aliquot was taken to determine the percent conversion of monomer by $^1$H NMR. The remaining polymerization solution was warmed to room temperature, diluted with DCM, and passed through a basic alumina column twice. The eluted polymer solution was partially concentrated under vacuum, and then precipitated in MeOH. Dissolution and precipitation was performed twice. The wet solids were collected and dried under high vacuum for 24 hours to yield 0.083 g, (85.3% recovery based on 39% conversion) of poly(rac-3) as a colorless gummy solid.

Example 9—Thermogravimetric Analysis (TGA)

TGA of poly(rac-1), poly(rac-2), and poly(rac-3) was performed to understand the thermal limitations for these systems.

Figure 7:
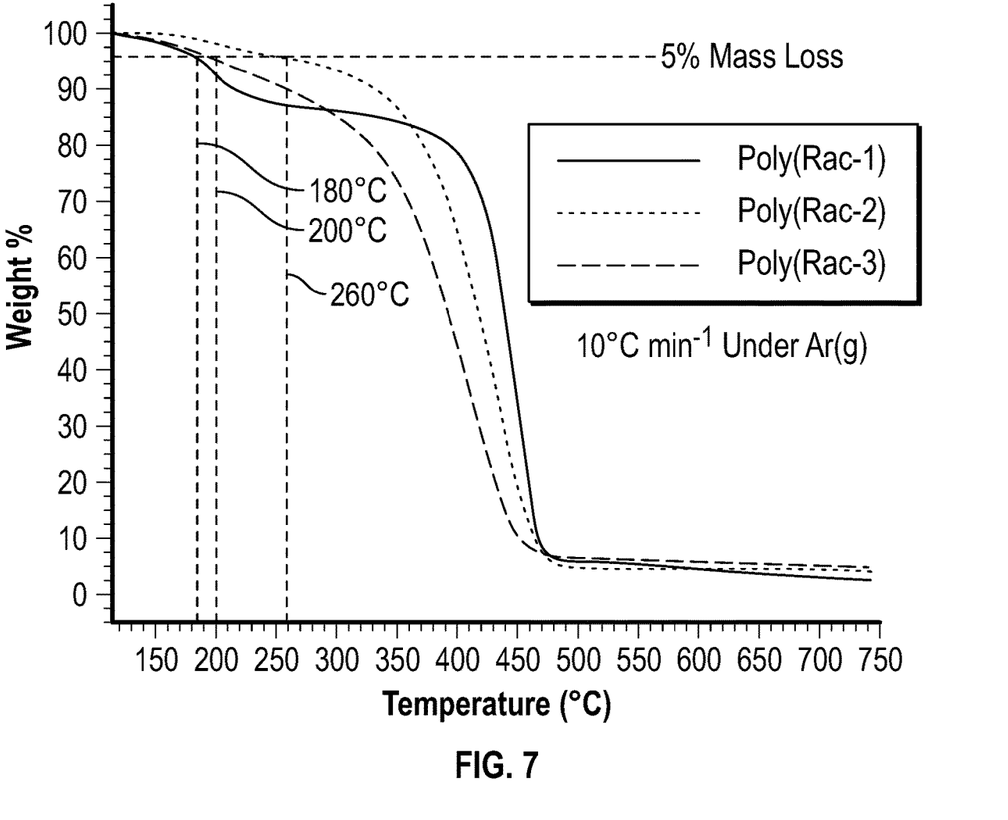
FIG. 7 depicts data sets collected from a thermogravimetric analysis of three embodiments of polymers.

Each polymer exhibited slightly different thermal decomposition profiles with a 5% initial mass loss at 180° C., 260° C., and 200° C., respectively (FIG. 7).

With knowledge of these thermal limitations, DSC analysis from −70° C. to approximately 200° C. was performed at 20° C. min$^{-1}$ on each of the polymer samples. Poly(rac-1) and poly(rac-3) both exhibited a midpoint glass transition temperature ($T_g$) at 29 and −45° C., respectively, while poly(rac-2) and poly(S-3) did not appear to have a $T_g$ within the thermal analysis window. The suppression of $T_g$ for isotactic poly(S-3) to <70° C. versus its atactic version, poly(rac-3) ($T_g$=−45° C.) was consistent with a reduction in $T_g$ seen for other isotactic versus atactic polymer systems.

None of the polymer samples of the foregoing examples revealed a crystalline melting temperature ($T_m$), which was consistent with the viscous fluid consistency of the samples at ambient conditions. Although highly isotactic polymers are known to exhibit semi-crystallinity, it was believed that the bulky TES group likely prevented crystalline chain packing.

I claim:

1. A method of polymerization, the method comprising:
contacting an allylic substituted cyclopentene with a catalyst to form a homopolymer;
wherein the allylic substituted cyclopentene has a structure according to at least one of Formula I and Formula II—

(I)

(II)

wherein R$^1$, R$^2$, R$^3$, and R$^4$ are independently selected from hydrogen or a C$_1$-C$_{30}$ hydrocarbyl.

2. The method of claim 1, wherein the allylic substituted cyclopentene of Formula I or Formula II is a racemic allylic substituted cyclopentene.

3. The method of claim 1, wherein the allylic substituted cyclopentene of Formula I or Formula II is an enantiopure allylic substituted cyclopentene.

4. The method of claim 1, wherein the allylic substituted cyclopentene has the structure according to Formula I, wherein R¹ is hydrogen.

5. The method of claim 1, wherein the allylic substituted cyclopentene (i) is a racemic allylic substituted cyclopentene, (ii) has the structure according to Formula I, wherein R¹ is a $C_2$-hydrocarbyl comprising an oxo substituent, and (iii) has the following structure:

6. The method of claim 1, wherein the allylic substituted cyclopentene (i) is an enantiopure allylic substituted cyclopentene, (ii) has the structure according to Formula I, wherein R¹ is hydrogen, and (iii) has the following structure:

7. The method of claim 1, wherein the allylic substituted cyclopentene has the structure according to Formula II, wherein each of R², R³, and R⁴ is an unsubstituted $C_1$ hydrocarbyl.

8. The method of claim 7, wherein the allylic substituted cyclopentene is a racemic allylic substituted cyclopentene having the following structure:

9. The method of claim 7, wherein the allylic substituted cyclopentene is an enantiopure allylic substituted cyclopentene having the following structure:

10. The method of claim 1, wherein the allylic substituted cyclopentene has the structure according to Formula II, wherein each of R², R³, and R⁴ is an unsubstituted $C_2$ hydrocarbyl.

11. The method of claim 10, wherein the allylic substituted cyclopentene is a racemic allylic substituted cyclopentene having the following structure:

12. The method of claim 10, wherein the allylic substituted cyclopentene is an enantiopure allylic substituted cyclopentene having the following structure:

13. The method of claim 1, wherein the allylic substituted cyclopentene has the structure according to Formula II, wherein each of R², R³, and R⁴ is independently selected from a $C_1$-$C_{10}$ hydrocarbyl.

14. The method of claim 1, wherein the catalyst comprises an olefin metathesis catalyst that includes ruthenium.

15. The method of claim 1, wherein the catalyst comprises a transition metal carbene complex.

16. The method of claim 1, wherein the homopolymer is at least 80% trans.

17. The method of claim 1, wherein the homopolymer is at least 95% trans.

18. The method of claim 1, wherein the homopolymer is at least 70% head-to-tail.

19. The method of claim 1, wherein the homopolymer is at least 95% head-to-tail.

20. A monomer comprising:
an allylic substituted cyclopentene having a structure according to at least one of Formula I and Formula II—

(I)

(II)

wherein R¹, R², R³, and R⁴ are independently selected from hydrogen and a $C_1$-$C_{30}$ hydrocarbyl, with the proviso that 3-t-butyldimethylsilyloxycyclopentene is excluded.

* * * * *